US011287808B2

(12) United States Patent
Schreder et al.

(10) Patent No.: US 11,287,808 B2
(45) Date of Patent: Mar. 29, 2022

(54) INDUSTRIAL PROCESS CONTROL AND AUTOMATION SYSTEM HAVING DECOUPLED CONTROLLERS

(71) Applicant: Honeywell International Inc., Morris Plains, NJ (US)

(72) Inventors: James M. Schreder, Ambler, PA (US); Paul F. McLaughlin, Ambler, PA (US); John J. Rosa-Bian, Ambler, PA (US); Joseph P. Felix, Coopersburg, PA (US)

(73) Assignee: Honeywell International Inc., Charlotte, NC (US)

( * ) Notice: Subject to any disclaimer, the term of this patent is extended or adjusted under 35 U.S.C. 154(b) by 166 days.

(21) Appl. No.: 16/669,899

(22) Filed: Oct. 31, 2019

(65) Prior Publication Data

US 2021/0132595 A1    May 6, 2021

(51) Int. Cl.
*G05B 19/418* (2006.01)

(52) U.S. Cl.
CPC ... *G05B 19/4186* (2013.01); *G05B 19/41835* (2013.01); *G05B 2219/31368* (2013.01);
(Continued)

(58) Field of Classification Search
CPC .......... G05B 19/4186; G05B 19/41835; G05B 2219/32128; G05B 2219/31368; G05B 2219/31369
See application file for complete search history.

(56) References Cited

U.S. PATENT DOCUMENTS

| 2007/0100471 A1* | 5/2007 | Kumar | ............... | G05B 19/0426 |
| | | | | 700/18 |
| 2008/0065705 A1* | 3/2008 | Miller | ................ | G05B 23/0221 |

(Continued)

FOREIGN PATENT DOCUMENTS

| WO | 2007053451 A1 | 5/2007 |
| WO | 2017015182 A1 | 1/2017 |

OTHER PUBLICATIONS

Search Report for corresponding European Application No. 20201904.8.

*Primary Examiner* — Christopher E. Everett
(74) *Attorney, Agent, or Firm* — Paschall & Associates, LLC; James C. Paschall

(57) ABSTRACT

An apparatus is disclosed that is used in an industrial process control and automation system that operates using an open platform data communication protocol. The apparatus includes a processor and a memory, and a communications interface connected to at least one process instrument and arranged to transmit instructions to and receive data from the at least one process instrument and to a data network of the industrial process control and automation system that communicates using the open platform data communication protocol. The apparatus memory contains a system repository file containing process data information sent to the apparatus from the at least one process instrument, a stored function block definition file containing function blocks that define a control strategy for controlling the at least one process instrument and an engineering repository containing the characteristics and parameters for the function blocks associated with the at least one process instrument. The processor operates to communicate the process data from the system repository file to the industrial process control and automation system using the open platform data communication protocol and to receive instructions from the industrial process control and automation system to execute the control strategy.

18 Claims, 4 Drawing Sheets

(52) U.S. Cl.
 CPC .............. *G05B 2219/31369* (2013.01); *G05B 2219/32128* (2013.01)

(56) References Cited

U.S. PATENT DOCUMENTS

| | | |
|---|---|---|
| 2017/0163444 A1 | 6/2017 | McLaughlin et al. |
| 2018/0024542 A1 | 1/2018 | Naik et al. |
| 2018/0321662 A1* | 11/2018 | Nixon .................... G06F 13/364 |
| 2019/0042378 A1* | 2/2019 | Wouhaybi ............ G05B 19/042 |

* cited by examiner

INDUSTRIAL PROCESS CONTROL AND AUTOMATION SYSTEM HAVING DECOUPLED CONTROLLERS

TECHNICAL FIELD

This disclosure relates generally to industrial process control and automation systems. More specifically, this disclosure relates to an industrial process control and automation system having its process controllers decoupled from the supervising layers of the system.

BACKGROUND

Industrial process control and automation systems are often used to automate large and complex industrial processes. These types of systems routinely include various components including sensors, actuators, and process controllers. The process controllers receive measurements from the sensors and generate control signals for the actuators. A hallmark of a modern well-bred process control system is a well-integrated and uniform suite of operations from the systems application layers to the control and sensing of the various I/O devices. This control has been achieved by bundling a variety of networked devices such as servers for providing system applications such as, historians and advanced control applications, workstations using various human machine interface (HMI) solutions for operators of the control system, to switches, routers, firewalls, safety systems and proprietary real-time controllers and industrial field devices and other I/O elements. The integrated nature of such systems achieves a harmonized behavior of all the components, elements and application layers of the system.

Many users of industrial process control and automation systems prefer one element, application or component from another and prefer that their favored components work and operate with several different process controllers, HMI solutions and applications. Many modern process control systems since the early 1990s have evolved from closed proprietary systems to more convenient connected and open systems. However, the open components for modern control systems have been focused to specific applications or networked communication protocols for such systems. Controllers and the general aspects of their programing, instructions and I/O and diagnostic behavior remain relatively closed and vendor specific in their operations.

SUMMARY

This disclosure provides an apparatus and system having its process controllers decoupled from the supervising layers of the system.

In a first embodiment, an apparatus is disclosed that is used in an industrial process control and automation system that operates using an open platform data communication protocol, the apparatus includes a processor and a memory, and a communications interface connected to at least one process instrument and arranged to transmit instructions to and receive data from the at least one process instrument and to a data network of the industrial process control and automation system. The communication interface is adapted to communicate using an open platform data communication protocol. A system repository file is stored in the memory containing process data information sent to the apparatus from the at least one process instrument. The memory further contains a stored function block definition file containing function blocks that define a control strategy for controlling the at least one process instrument and an engineering repository containing the characteristics and parameters for the function blocks associated with the at least one process instrument. The processor operates to communicate the process data from the system repository file to the industrial process control and automation system using the open platform data communication protocol and operates to receive instructions from the industrial process control and automation system to execute the control strategy.

In a second embodiment, a system is disclosed for controlling at least one process instrument in an industrial process control and automation system that operates using an open platform data communication protocol the system including, a data network, at least one operator station connected to the data network and at least one controller. The at least one controller including a processor and a memory, and a communications interface connected to the least one process instrument arranged to transmit instructions to and receive data from the at least one process instrument and to the data network adapted to communicate using the open platform data communication protocol. A system repository file is stored in the memory and contains process data information sent to the controller from the at least one process instrument. The memory further contains a stored function block definition file containing function blocks that define a control strategy for controlling the at least one process instrument and an engineering repository containing the characteristics and parameters for the function blocks associated with the at least one process instrument. The processor operates to communicate the process data from the system repository file to the operator station using the open platform data communication protocol and operates to receive instructions from the operator station to execute the control strategy.

BRIEF DESCRIPTION OF THE DRAWINGS

For a more complete understanding of this disclosure, reference is now made to the following description, taken in conjunction with the accompanying drawings in which.

DETAILED DESCRIPTION

FIGS. 1-4 discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Distributed process control systems as they are constructed today, are integrated into layers of functional control each layer providing a system of control ranging from a local to an enterprise level of control. At a first level, process instruments and sensors are controlled through local controllers. Data from connected sensor and commands to the controllers are typically transmitted via a network to/from a supervisory control layer. The supervisory control layer uses supervisory servers to log information collected or generated by the controllers, such as status information related to the operation of the process elements. The servers could also execute applications that control the operation of the controllers, generate functional control blocks for executing control strategy, thereby controlling the operation of the process elements. One or more operator stations coupled to the servers provide user access to the servers which could then provide user access to the controllers and the process elements.

In the past, due to hardware, memory, processing power and bandwidth constraints the supervisory controllers as well as engineering control services of a control system required the use of dedicated servers to conduct these functions for the control system. This embodiment contemplates a distributed control system architecture that decouples the supervising layer and the supervisory servers from the process controllers, allowing the control applications and engineering databases to reside in a memory in the process controller thereby allowing the included imbedded processor of the process controllers to execute control over the process elements of the system.

Figure 1:
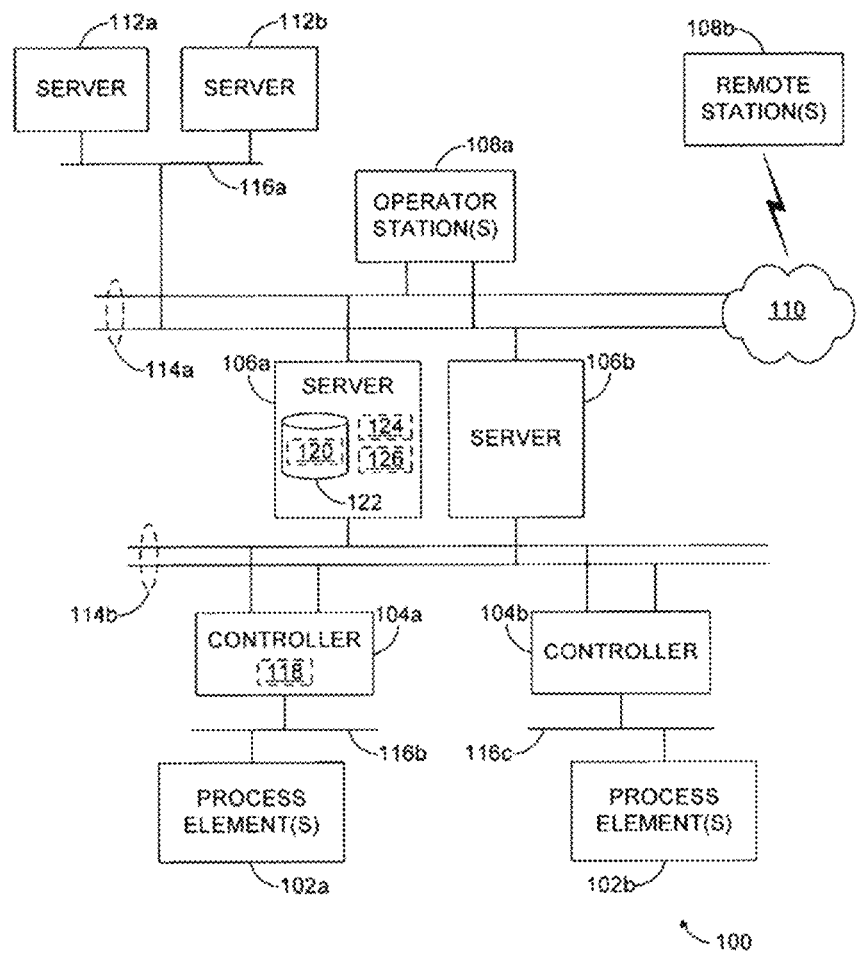
FIG. 1 illustrates an example industrial process control and automation system.

FIG. 1 illustrates an exemplary distributed process control system architecture 100, as is currently used to provide control of a manufacturing processes. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a processing environment that perform any of a wide variety of functions. For example, the process elements 102a-102b could represent motors, valves, and other industrial equipment in a processing environment. The process elements 102a-102b could represent any other or additional components in a processing environment. Each of the process elements 102a-102b includes any hardware, software, firmware, or combination thereof for performing one or more functions in a processing environment. The process elements 102a-102b could, for example, represent any component, device, or system capable of manipulating, altering, or otherwise processing one or more materials in a processing environment. Two process controllers 104a-104b are coupled to the process elements 102a-102b. The process controllers 104a-104b control the operation of the process elements 102a-102b. For example, the controllers 104a-104b typically provide control signals to the process elements 102a-102b. Each of the controllers 104a-104b includes any hardware, software, firmware, or combination thereof for controlling one or more process elements 102a-102b.

Two servers 106a-106b are coupled to the controllers 104a-104b. The servers 106a-106b perform various functions to provide supervisory support for the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. Each of the servers 106a-106b could, for example, include one or more processors and one or more memories capable of storing data and instructions used by the processors.

Due to memory limitations within controller products (such as purpose-built hardened controller platforms), control execution events are typically transmitted on a timely basis to a supervisory servers 106a-106b. Also, due to the nature of controller/server communications, there are times when a link or one or more of these platforms are not available. This may occur, for example, during redundant server failover, redundant controller failover, or interruption of a communication link between the controller and the server. The control events that are generated in a control execution environment are retained within the event buffer in the process controllers 104a-104b and sent to the supervisory server when the defined interruption no longer exists.

One or more operator stations 108a-108b are coupled to the servers 106a-106b. The operator stations 108a-108b represent computing or communication devices providing user access to the servers 106a-106b, which could then provide user access to the controllers 104a-104b and the process elements 102a-102b. For example, the operator stations 108a-108b could allow users to review the operational history of the process elements 102a-102b using information collected by the controllers 104a-104b and servers 106a-106b.

The operator stations 108a-108b could also allow the users to adjust the operation of the process elements 102a-102b, controllers 104a-104b, or servers 106a-106b. Each of the operator stations 108a-108b includes any hardware, software, firmware, or combination thereof for supporting user access and control of the system 100. Each of the operator stations 108a-108b could, for example, include one or more processors and one or more memories capable of storing data and instructions used by the processors.

In this example, at least one of the operator stations 108b is a remote station. The remote station is coupled to the servers 106a-106b through a remote network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the overall operation of the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100. Each of the servers 112a-112b could, for example, include one or more processors and one or more memories capable of storing data and instructions used by the processors.

As shown in FIG. 1, the system 100 includes various redundant networks 114a-114b and single networks 116a-116c that support communication between components in the system 100. Each of these networks 114a-114b, 116a-116c represents any suitable network or combination of networks facilitating communication between components in the system 100. The networks 114a-114b, 116a-116c could, for example, represent Ethernet networks.

In one aspect of operation, control processes are implemented by the controllers 104a-104b, and the control processes are constructed using function blocks 118. The function blocks 118 represent executable software objects that perform specific tasks. Each function block 118 may also be represented graphically by a symbol and have specified parameters (such as one or more inputs and/or one or more outputs). To define a control process, a user may select particular function blocks 118 and link the inputs and outputs of the selected function blocks 118. The controllers 104a-104b could then implement the defined control process.

There may be any suitable type and number of function blocks 118 in the system 100. The function blocks 118 could, for example, include "component blocks" that represent basic functions. These basic functions could be combined into larger function blocks called "container blocks." "Stand-alone blocks" represent function blocks that do not contain component blocks and that are not contained within container blocks. These represent only examples of the types of function blocks 118 that may be used in the system 100. Other or additional types of function blocks 118 could be used in the system 100.

Different types of function blocks 118 are associated with different block definition files 120. A block definition file 120 defines various characteristics of an associated type of function block 118. For example, the block definition file 120 could define parameters (such as inputs and outputs) for a type of function block 118. The block definition file 120 could also define the symbol that graphically represents a type of function block 118. The block definition file 120 could further define a form layout for a type of function block 118, where the form layout is used later by a user to configure function blocks 118 for use in a control process.

In this example, the block definition files 120 are stored in a database 122. The database 122 includes any hardware, software, firmware, or combination thereof for storing and facilitating retrieval of information. The database 122 may use any of a variety of data structures, arrangements, and compilations to store and facilitate retrieval of information. In some embodiments, the database 122 represents an Engineering Repository Data Base (ERDB).

Control processes are constructed with the function blocks 118 using a process builder application 124. The process builder application 124 provides a graphical user interface that allows a user to create or edit control processes using the graphical symbols representing the types of function blocks 118. For example, the process builder application 124 may allow the user to select particular types of function blocks, which presents the graphical symbols representing the selected types of function blocks to the user. The user may then link the inputs and outputs of the selected types of function blocks. Instances of the selected function blocks types (the function blocks 118) may then be created and used to implement a control process. The process builder application 124 includes any hardware, software, firmware, or combination thereof for creating or editing control processes. The process builder application 124 could, for example, represent a CONTROL BUILDER application by HONEYWELL INTERNATIONAL, INC.

As noted above, conventional process control systems typically lack a mechanism for allowing users to create or edit function block types or the parameters associated with the function block types. In accordance with this disclosure, users have access to a function block editor 126. The block editor 126 provides a graphical user interface that allows a user to create or edit function block types and to create or edit parameters associated with function block types. For example, the block editor 126 may allow users to create, edit, or delete block definition files 120, which allows the users to control which types of function blocks 118 are transferred to the controllers 104a-104b for use in the process control system 100.

In particular embodiments, the block editor 126 may be used to create or edit custom algorithm function block types, custom data block types, and function block types for Foundation Fieldbus devices. Custom algorithm blocks contain user-defined algorithms and user-defined data structures. Custom data blocks support user-defined data parameters. Foundation Fieldbus blocks are used with devices supporting Foundation Fieldbus technology, which supports dynamic integration of dedicated field devices with digitally based control systems. Instances of these function block types defined by the users may then be incorporated into control processes using the process builder application 124. This represents only several examples of the types of function blocks that may be created, edited, or deleted using the block editor 126. The block editor 126 may be used to create, edit, or delete any other or additional types of function blocks. As a particular example, the block editor 126 could be used to create, edit, or delete proprietary function block types used within a system or controller.

The block editor 126 includes any hardware, software, firmware, or combination thereof for creating or editing function block types or their associated parameters. The block editor 126 could, for example, be implemented as an Active-X Control.

Figure 2:
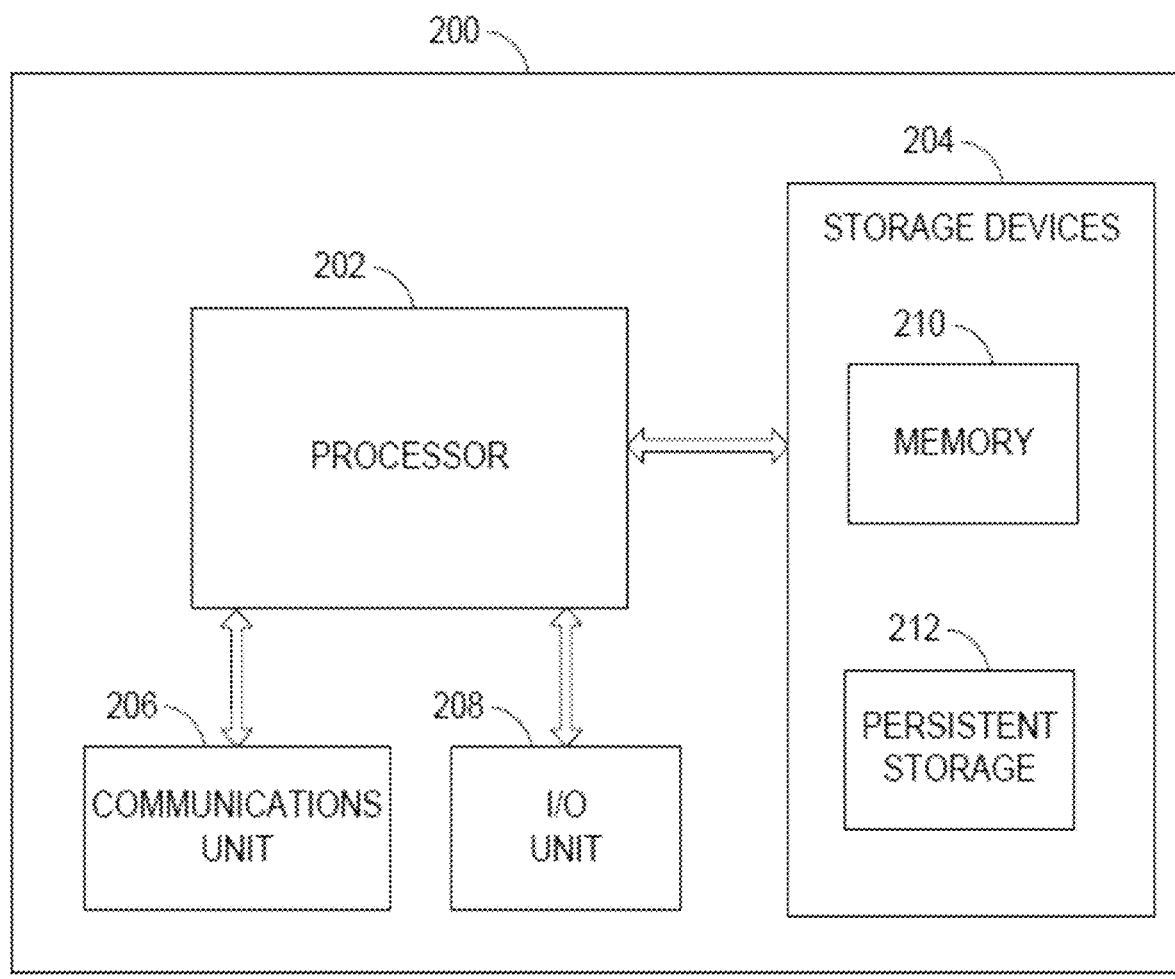
FIG. 2 illustrates details of an example controller showing its internal components and functions, according to this disclosure.

FIG. 2 illustrates an example of a controller 200 according to this disclosure. The process controller 200 could represent, for example, either of the process controllers 104a-104b in FIG. 1. However, the device 200 could be used in any other suitable system and could represent any suitable device in that system.

As shown in FIG. 2, the controller 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry. The processor 202 would execute any suitable instructions, such as those implementing control and supervision of process elements 102a-102b.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, flash memory, or optical disc. In the present disclosure, persistent storage 212 includes databases 230 and 240 that includes any hardware, software, firmware, or combination thereof for storing and facilitating retrieval of information. Databases 230, and 240 may use any of a variety of data structures, arrangements, and compilations to store and facilitate retrieval of information.

A communication unit 206 supports communications with other systems or process instruments and devices. For example, at least one communication unit 206 could include one or more wired communication networks that support data communications through any suitable physical or communication link(s) using any number or form of communication protocols for communicating with process instruments, such as FOUNDATION FIELDBUS, HART, PROFIBUS and MODBUS. The communication unit 206 also connects the controller 200 to data communication networks, such as networks 114*a*-114*b* that support communication between components in the system 100.

An I/O unit 208 allows for input and output of data and commands to a network. For example, unit 206 may provide a connection for user input of an operator station through a keyboard, mouse, keypad, touchscreen, or other suitable input device. The unit 206 may also send output to a display, printer, or other suitable output device.

Figure 3:
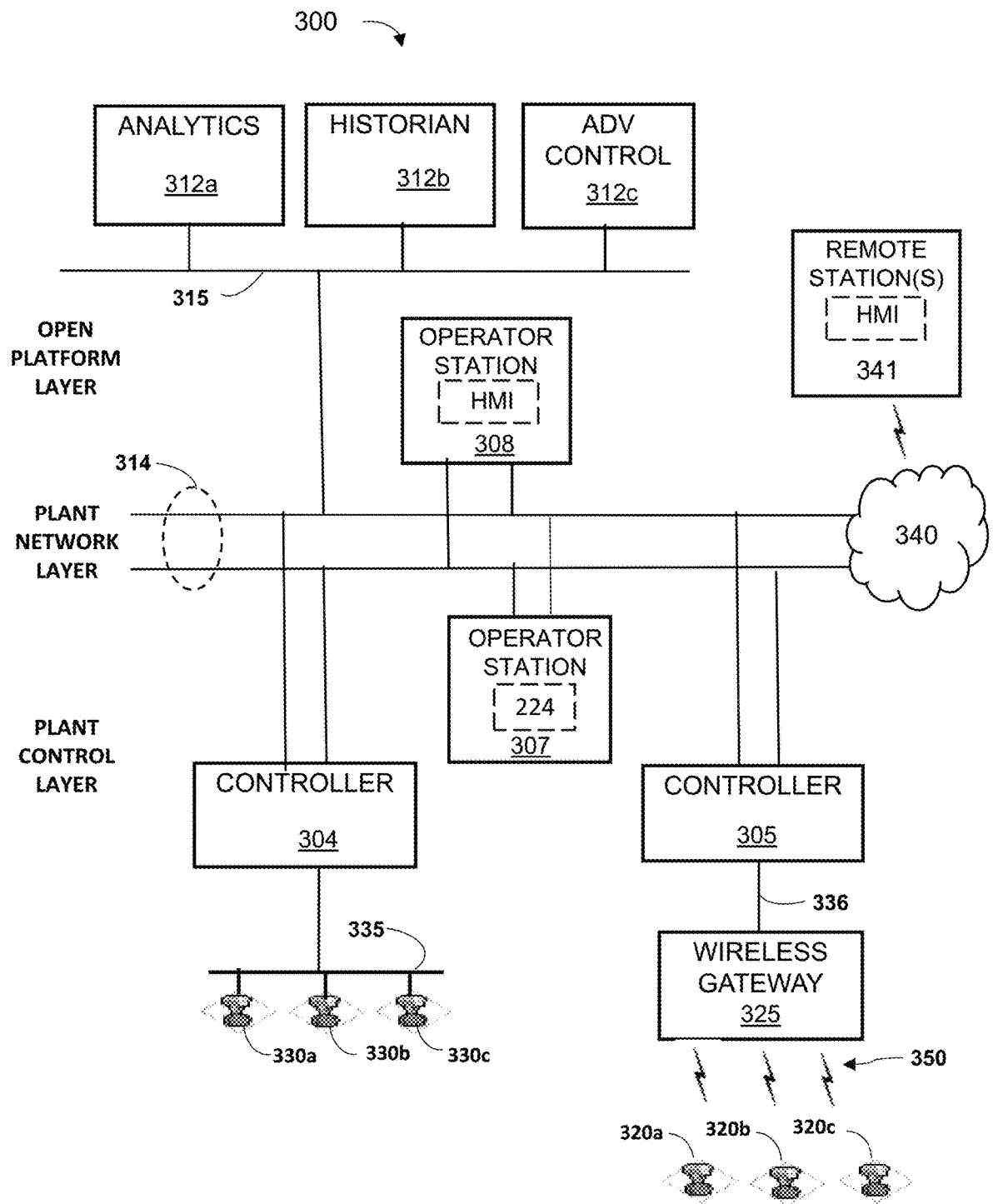
FIG. 3 illustrates the industrial process control system having decoupled process controllers in accordance with the disclosed embodiments.

FIG. 3 illustrates the components of an industrial automation system architecture having decoupled controllers in accordance to one or more embodiments. As shown in FIG. 3, the industrial automation system 300 is organized into three primary layers, an Open Platform Layer, a Plant Network Layer, and a Plant Control Layer. The Plant Control Layer may include one or more process instruments or devices such as sensors, actuators, flow meters, pressure and temperature transmitters and other devices that operate in a processing facility, as well as, controllers, and wireless gateways. Controller 304 provides both local and supervisory control over one or one more wired process instruments or devices, 330*a*-330*c*, over a wired network 335 operating under one or more bus protocols, such as FOUNDATION FIELDBUS, PROFIBUS, HART or MODBUS. The controller 304 could be a single controller or a dual redundant pair of controllers operating in a single or dual redundant network configuration.

Controller 305 provides local and supervisory control over one or more wireless process instruments or devices 320*a*-320*c* via a wireless gateway device 325. Wireless Gateway 325 sends and receives data wirelessly using a wireless network 350 to wireless process instruments or devices 320*a*-320*c* using a one or more industrial wireless communication protocols, such as WirelessHART, and ISA100. Controller 305 could also be a single controller or a dual redundant pair of controllers, operating in a single or dual redundant network configuration.

The Network Layer 314 may include any suitable wired or wireless network, such as, for example, a local area network (LAN), wide area network (WAN), Ethernet, wireless fidelity (WiFi), IEEE 802.11 or ISA100. As a particular example, the network 314 in this embodiment represents a redundant pair of Ethernet networks, such as a FAULT TOLERANT ETHERNET (FTE) network from HONEYWELL INTERNATIONAL INC.

The plant network layer can also be connected to a cloud network 340 and to one or more remote operator stations 341. The remote station 341 is coupled to the plant network layer 314 via a cloud network 340. The cloud network 340 facilitates communication between various components in the system 300, including controllers 304, 305, modules 312*a*-312*c* and operator stations 307, 308. For example, the network 340 may communicate Internet Protocol (IP) packets, frame relay frames, Asynchronous Transfer Mode (ATM) cells, or other suitable information between network addresses. The cloud network 340 may include one or more local area networks (LANs), metropolitan area networks (MANs), wide area networks (WANs), all or a portion of a global network such as the Internet, or any other communication system or systems at one or more locations. Additionally, cloud network 340 can also support and any open data communication protocol such as an OPC UA (Open Platform Connectivity Unified Architecture) data protocol and its core services for synchronous and asynchronous data publication, alarms and event publication, history data transfer, and the like.

The Open Platform Layer includes at least an analytics module 312 a, a historian module 312*b* and an advanced control module 312*c* as well as an operator station 308 running any suitable HMI software application. The modules 312*a*-312*c* provide various functions to the overall operation of the system 300. For example, the analytics module 312 a could be used to provide tools for predictive analytics, to delivers insights about future performance, based on historical data. The historian module 312*b* serves as a repository for process data from the controllers 304, 305 process instruments and devices 330*a*-330*c*, 320*a*-320*c* of system 300. The historical data stored in the historian 312*b* can be retrieved by the other modules of the open platform layer as well as operator station 308 and remote station 341 via cloud network 340. For example, the historical data could be used as the basis for predictive analytics and also in developing advanced software models by the Advanced Control Module 312*c*. Advanced control module 312*c* is tasked in implementing model predictive control (MPC) or other advanced predictive control (APC) models that can be sent to one or more controllers to control process instruments and other equipment using the models and predictions developed by module 312*c*. Each of the modules 312*a*-312*c* includes any hardware, software, firmware, or combination thereof for controlling the overall operation of the system. Each module 312*a*-312*c* of the Open Platform Layer can be configured as single or multiple server platforms and could include, for example, one or more processors and one or more memories capable of storing data and instructions used by the processors. Even though FIG. 3, illustrates that modules 312*a*-312*c* are connected locally in the plant via the plant network 314, modules 312*a*-321*c* could also be located in a remote location and connected to system 300 via cloud network 340.

The Open Platform Layer also includes an Operator Station 308. The station 308 represents computing or communication devices providing user access to the components and devices of the system 300. For example, the operator stations 308 could allow users to review on an included display, the operational history of the process instruments and devices stored in historian 312*b* and collected by controllers 304 and 305. It can also execute software programs to allow a user to run "pattern-based discovery and predictive-process analytics", with the data from the analytics module 312*a*.

The Operator Station 308 uses a human machine interface (HMI) software application to allow overall user communication and control of system 300. The HMI represents a software application that is tasked to provide user access to the Open Platform Layer and its modules, as well as access to the Plant Control Layer and its controllers, process instruments and devices. For example, the HMI could allow users and the operators of the system 300, to adjust the operation of the process instruments and devices and controllers. The HMI would include any hardware, software, firmware, or combination thereof for supporting user access and control of the system 300. The HMI could, for example, provide advanced process control from the advanced control module implementing model predictive control (MPC) or other advanced predictive control (APC) to one or more controllers to control process instruments and other equipment using the models and predictions developed by the advanced control module in real-time.

Figure 4:
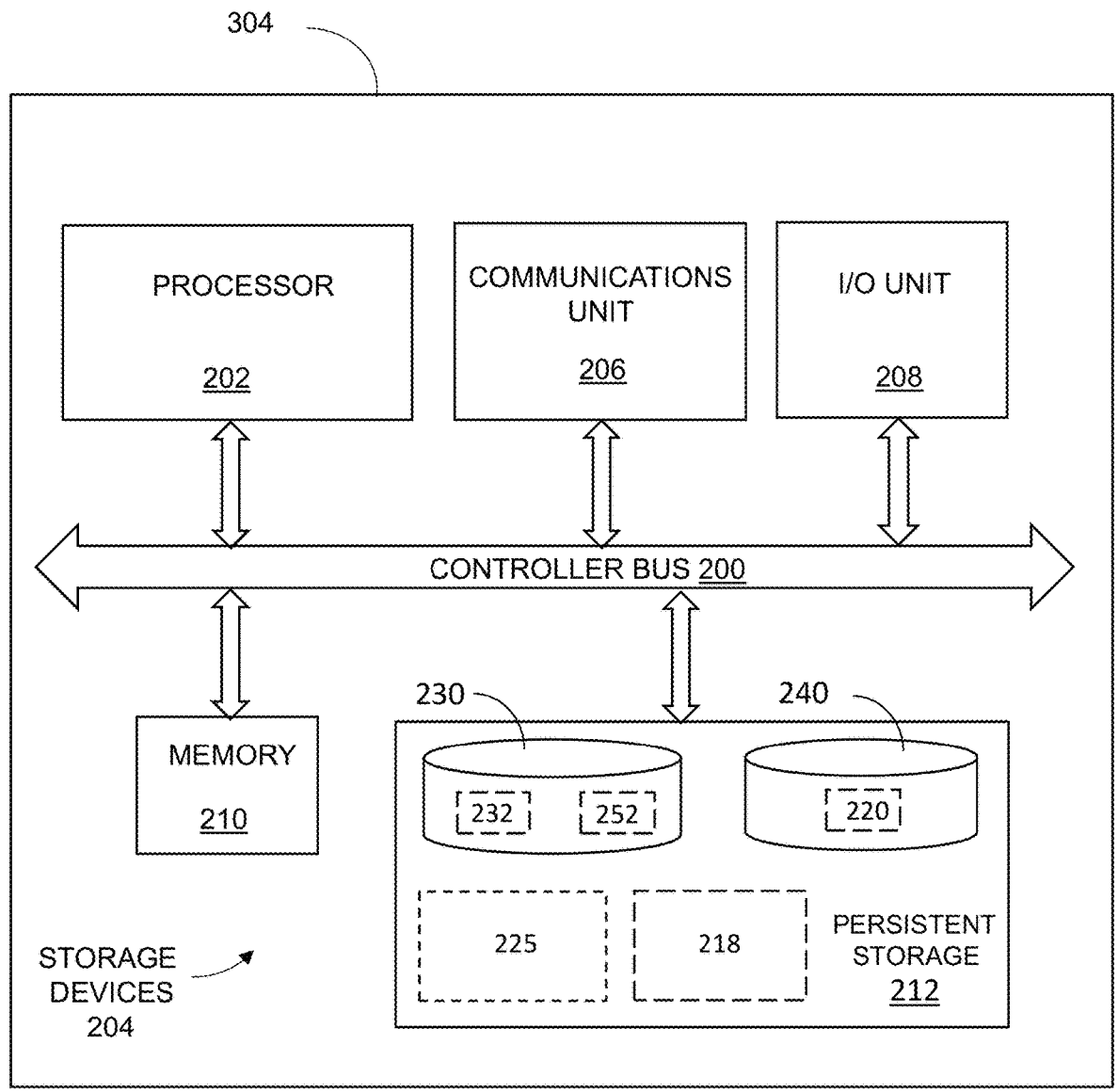
FIG. 4 illustrates details of the internal components and functions of a decoupled process controller in accordance with disclosed embodiments.

Turning to FIG. 4, the controller 304 of the disclosure is illustrated. For the purpose of this embodiment, controller 304 will be used to explain the operation of a decoupled controller. Controller 305 is also a decoupled controller and includes the same internal components and operates in the same manner as controller 304. Controller 304 includes a processor 202, memory 210, storage devices 204, I/O unit 208, communication unit 206 and controller bus 200. Controller Bus 200 provides a unified bidirectional high-speed system bus that provides data, address and memory connectivity to components and devices of controller 304. The communication unit 206 supports data communication with other systems and process instruments and devices 330a-330c via a network bus 335 employing any suitable bus protocol, such as, FOUNDATION FIELDBUS, PROFIBUS, HART or MODBUS. Communication unit 206 also provides network data communication to the platform layer via network 314 to user operated input/output devices such as data terminals, displays, printers or other suitable communication devices, such as operator stations 307, 308 and remote station 341.

The processor 202 of controller 304 can run command and control applications, stream and batch analytics, and send device generated telemetry data to the Open Platform Layer via communication unit 206 and plant network 314. Similarly, data originating in the Open Platform Layer may be sent to the process instruments and devices, for example devices 330a-330c through controller 304, such as for example, MPC and APC control and command data and instructions to the connected devices and sensors.

The controller 304 of the present embodiment includes an open protocol data communication and security software application 225 stored in persistent storage 212, that operates as a common protocol machine, arranged to deliver downstream connectivity to the Plant Control Layer and other devices and systems using open communication protocols. Also, open protocol data communication and security software 225 it is arranged to provide upstream connectivity to modules 312a-312c, operator stations 308 and other devices of the Open Platform Layer connected to Plant Network 314 as well as any remote stations or other devices connected to cloud network 340. Data collected from the downstream protocols is mapped to a unifying abstraction layer that provides a consistent namespace and data services for information publication to the modules 312a-312c and operator station 308 associated with the Open Platform Layer.

In the past, each software or application developer needed to write a custom interface (or server/driver) to exchange data with hardware process instruments and devices. The industrial open protocol standards replaced this practice by providing a common interface that permits this work to be done once, and then easily reused by HMI and custom applications.

For example, the Open Platform Connectivity (OPC) specification is based upon the Microsoft. Object linking and embedding OLE (now ActiveX), Component Object Model (COM), and Distributed Component Object Model (DCOM) technologies. DCOM provides a set of interfaces allowing clients and servers to communicate within the same computer running a compatible operating system. OPC defines a standard set of interfaces, properties, and methods for use in process control, manufacturing, and automation applications. These applications include distributed control systems, programmable logic controllers, input/output (IO) systems, smart field devices, and other servers of real-time information. The ActiveX/COM technologies define how individual software components interact and share data. By using the Microsoft Visual Basic object-oriented component, OLE Automation, OPC can provide office applications with plant floor data via local area networks (LANs), remote sites, or the Internet.

OPC protocol provides many benefits to end users and hardware and software manufacturers, including open connectivity, high performance, and improved vendor productivity and security. OPC provides open connectivity giving users a choice among a wider variety of plant floor devices and client software, allowing better utilization of best-in-breed applications. Because OPC is an open standard, software and hardware manufacturers devote less time to connectivity issues and more time to application issues, eliminating significant duplicate effort. OPC fosters greater interoperability between automation and control applications, field devices, and business and office applications. Other open protocols data communication protocols can be used to communicate in system 300 including, for example, Ethernet/IP, ProfiNet, IEC-61850, Modbus/TCP, HART/IP, and the like.

Processor 202 uses a communication stack that supports an Open Platform Connectivity Unified Architecture (OPC UA) data protocol and its core services for synchronous and asynchronous data publication, alarms and event publication, history data transfer, blind record or "BLOB" transfer, and the like. The OPC UA architecture is platform and operating system independent because it does not depend on DCOM technology to communicate between the components of the system. OPC UA further includes security features including encryption and certificate-based authentication. The security services are available for the platform, the network connections and the control layer its device providing secure guard traffic flow bi-directionally to protect both the open platform layer modules and operator stations and the plant control layers systems and devices. Other open platform protocols can be supported as an alternative to or in addition to OPC UA.

The present embodiment decouples the supervising layer and the supervisory servers 106a-106b from the process controllers 304, 305. The control applications, engineering databases and names and name services formerly residing in supervisory servers 106a-106b now reside in a persistent storage 212 of controller 304. Persistent storage 212 includes databases 230 and 240 that includes any hardware, software, firmware, or combination thereof for storing and facilitating retrieval of information.

Database 230 performs the functions of the supervisory servers 106a-106b. In this embodiment, database 230 acts as a system repository configured to log information collected or generated by the controller 304 such as status information related to the operation of the process devices into a memory file 232. The information collected and stored in memory file 232 is uploaded to the network 314 via communication unit 206 for storage and use by modules 312a-312b and access by operator station 308.

A names and name service is provided by an executable software application 252 and also stored in system repository database 230 along with the supporting translation library for this service. The names and names service application 252, provides plain text name references used directly with controller 304 to access control objects or other configuration data without the use of specific control object identifiers. For example, a library of controller objects and functions is maintained in a database 230 that supports the operation of the controller 304, such as, function block, algorithm, process, or any other executable element. Additionally, the name and names service can support use of plain text messaging to access, alarm functions, property/parameter, tags and improved control functions for the process instruments and devices connected to the controller 304. The translation library is built on the control execution environment of controller 304.

Database 240 stores executable software applications that control the operation of the controllers and contain function block definitions 220 for functional control blocks 218. Function blocks 218 execute control strategy, thereby controlling the operation of the process instruments and devices connected to controller 304. As was explained in FIG. 1, the function blocks 218 represent executable software objects that perform specific tasks. Each function block 218 may also be represented graphically by a symbol and have specified parameters (such as one or more inputs and/or one or more outputs). To define a control process, a user may select particular function blocks 218 and links the inputs and outputs of the selected function blocks 218.

There may be any suitable type and number of function blocks 218 stored in persistent memory 212. The function blocks 218 could, for example, include "component blocks" that represent basic functions. These basic functions could be combined into larger function blocks called "container blocks." "Stand-alone blocks" represent function blocks that do not contain component blocks and that are not contained within container blocks. These represent only examples of the types of function blocks 218 that may be used by controllers 304.

Different types of function blocks 218 are associated with different block definition files 220. A block definition file 220 defines various characteristics of an associated type of function block 218. For example, the block definition file 220 stored in database 240 could define parameters (such as inputs and outputs) for a type of function block 218. The block definition file 220 could also define the symbol that graphically represents a type of function block 218. The block definition file 220 could further define a form layout for a type of function block 218, where the form layout is used later by a user to configure function blocks 218 for use in a control process.

In this embodiment, the block definition files 220 are stored in the database 240. The database 240 includes any hardware, software, firmware, data structures or arrangements or combination thereof for storing and facilitating retrieval of information. In some embodiments, the database 240 represents an Engineering Repository Database (ERDB).

In the system 100 example of FIG. 1, control instructions are constructed for function blocks 118 using a process builder application 124 maintained in the supervisory server 106a-106b. The process builder application 124 provides a graphical user interface that allows a user to create or edit control processes using graphical symbols representing the types of function blocks 118. For example, the process builder application 124 may allow the user to select particular types of function blocks, which presents the graphical symbols representing the selected types of function blocks to the user. The user may then link the inputs and outputs of the selected types of function blocks. Instances of the selected function blocks types (the function blocks 118) may then be created and used to implement a control process. The process builder application 124 includes any hardware, software, firmware, or combination thereof for creating or editing control processes. The process builder application 124 could, for example, represent a CONTROL BUILDER application by HONEYWELL INTERNATIONAL, INC.

However, in the embodiment of system 300, an operator station 307 is used to connect controller 304 to a process builder application 224 executing in operator station 307. A user can use the process builder application 224 to create or edit function blocks 218 using the data stored in ERDB 220. The process builder application 224 could allow users to create, edit, or delete block definition files 220, thereby controlling which types of function blocks 218 are used by controller 304. The operator station 307 and process builder application 224 connects to controller 304 via the network layer 314.

Data communication and security application software stored in persistent storage 225 provides core security for equipment controllers 304 of the Plant Control Layer. The open protocol application 225 works in conjunction with communication unit 206 to perform deep packet inspection of incoming traffic from network 314 and operator station 307 as well as from operator station 341 and the network 314 via the cloud network 340.

Since each controller 304 in the Plant Control Layer includes an open protocol communication and security application 225 the controllers can provide flexible scalability and deployment within the plant control layer using the Plant Network Layer 314. For example, new controllers and other control devices can be added to the Plant Control Layer by connecting the controllers and devices to network 314 without the need of configuring supervisory servers to handle new devices. The open standard internal protocol (IP) based industrial or commercial protocol decouples the controllers from the supervisory system thereby rendering each controller independent of any supervising device or server. For example, the controller 304 of the present embodiment can be integrated into an industrial plants control layer and operated from operator station 308 HMI via network 314. Upstream and downstream data handling and security is accomplished by the open protocol application 225 connecting controller 304 to the HMI using at least one open protocol such as Ethernet/IP, OPC UA, ProfiNet, IEC-61850, Modbus/TCP, HART/IP, and the like.

Additionally, the plant control layer and controller 304 using at least one open data communication and security protocol can operate in a hybrid configuration able to communicate to devices and operator stations on network 314 as well as to devices and remote stations operating using open platform protocol connected via cloud network 340.

Although FIG. 4 illustrates one example of a decoupled controller 304, various changes may be made to FIG. 4. For example, the controller 304 components and functions could come in a wide variety of configurations. The controller 304 shown in FIG. 4 is meant to illustrate one example and type of a decoupled controller and does not limit this disclosure to any particular type of controller configuration.

Controller 305 operates in the similar manner as controller 304, however, as is illustrated in FIG. 3, controller 305 is connected via a wired network connection 336 to a wireless gateway 325. The wireless gateway 325 includes a least one wireless radio device that operates using an industrial wireless protocol, such as for example, WirelessHART or ISA100. The wireless gateway 325 transmits data and command signals via a wireless network 350 to wireless process instruments 320a-320c. Sensor and process data in turn are transmitted from the wireless process instruments 320a-320c to the wireless gateway 325 via wireless network 350. The wireless gateway transmits the data received on the wireless network 350 via network connection 336 to controller 305 for processing by the open platform layer.

In some embodiments, various functions described in this patent document are implemented or supported by a computer program that is formed from computer. This embodiment contemplates a distributed control system architecture that decouples the supervising layer and the supervisory servers from the process controllers, allowing the control applications and engineering databases to reside in a memory in the process controller thereby allowing the included imbedded processor of the process controllers to execute control over the process elements of the system, readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus used in an industrial process control and automation system that operates using an open platform data communication protocol, the apparatus comprising;
   a processor and a memory;
   a communications interface connected to at least one process instrument arranged to transmit instructions to and receive data from the at least one process instrument and to a data network of the industrial process control and automation system, the communications interface arranged to communicate using the open platform data communication protocol;
   a system repository file stored in the memory containing process data information sent to the apparatus from the at least one process instrument;
   a function block definition file stored in the memory containing function blocks that define a control strategy for controlling the at least one process instrument;
   an engineering repository file stored in the memory containing characteristics and parameters for the function blocks associated with the at least one process instrument; and
   wherein the processor operates to communicate the process data from the system repository file to the industrial process control and automation system using the open platform data communication protocol and operates to receive instructions from the industrial process control and automation system to execute the control strategy, the industrial process control and automation system decouples the apparatus from supervising layer and supervisory servers and allows the engineering repository file to reside in the memory of the apparatus to execute control of the at least one process instrument of the industrial process control and automation system.

2. The apparatus of claim 1, wherein the memory is a persistent storage device.

3. The apparatus of claim 2, wherein the persistent storage device includes a system repository database containing the system repository file, the system repository database storing and logging information collected or generated by the apparatus related to the operation of the at least one process instrument.

4. The apparatus of claim 3, wherein the system repository database further includes a names and name software application that includes a names and name service for providing plain text name references used by the apparatus to access function block control objects or other configuration data without the use of specific function block identifiers.

5. The apparatus of claim 2, wherein the persistent storage device includes an engineering repository database containing the engineering repository file, the engineering repository database storing block definition files that define the characteristics of an associated function block.

6. The apparatus of claim 2, wherein the persistent storage device includes a data communication and security software application that manages the open platform data communication protocol.

7. The apparatus of claim 6, wherein the data communication and security software application includes a communication stack used by the processor to support an OPC UA open platform data communication protocol.

8. A system for controlling at least one process instrument in an industrial process control and automation system that operates using an open platform data communication protocol, the system comprising;
   a data network;
   at least one operator station connected to the data network; and
   at least one controller including:
   (a) a processor and a memory;
   (b) a communications interface connected to the at least one process instrument arranged to transmit instructions to and receive data from the at least one process instrument and to the data network, the communications interface adapted to communicate using the open platform data communication protocol;
   (c) a system repository file stored in the memory containing process data information sent to the at least one controller from the at least one process instrument;
   (d) a function block definition file stored in the memory containing function blocks that define a control strategy for controlling the at least one process instrument;
   (e) an engineering repository file stored in the memory containing characteristics and parameters for the function blocks associated with the at least one process instrument; and
   wherein the processor operates to communicate the process data from the system repository file to the operator station using the open platform data communication protocol and operates to receive instructions from the operator station to execute the control strategy, the industrial process control and automation system decouples the at least one controller from supervising layer and supervisory servers and allows the engineering repository file to reside in the memory of the at least one controller to execute control of the at least one process instrument of the industrial process control and automation system.

9. The system of claim 8, wherein the memory is a persistent storage device.

10. The system of claim 9, wherein the persistent storage device includes a system repository database containing the system repository file, the system repository database storing and logging information collected or generated by the at least one controller related to the operation of the at least one process instrument.

11. The system of claim 10, wherein the system repository database further includes a names and name software application that includes a names and name service for providing plain text name references used by the at least one controller to access function block control objects or other configuration data without the use of specific function block identifiers.

12. The system of claim 9, wherein the persistent storage device includes an engineering repository database containing the engineering repository file, the engineering repository database storing block definition files that define the characteristics of an associated function block.

13. The system of claim 12, wherein a second operator station is connected to the data network, the second operator station including a process builder software application that is operated by a user to create and edit the function blocks defined in the function block definition file using the data stored in engineering repository database.

14. The system of claim 9, wherein the persistent storage device includes a data communication and security software application that manages the open platform data communication protocol.

15. The system of claim 14, wherein the data communication and security software application includes a communication stack executed by the processor to support an OPC UA open platform data communication protocol and its core services for synchronous and asynchronous data transmission between the at least one controller and the at least one operator station.

16. The system of claim 8, wherein the operator station includes a human machine interface (HMI) to allow overall user communication and control of the system and to receive data from the at least one controller to manage the operation of the at least one controller and process instrument.

17. The system of claim 8, wherein the data network is connected to a cloud network and to at least one remote operator station.

18. The system of claim 8, wherein a second controller is connected to the data network, the second controller including a communication interface connected to at least one wireless gateway, the wireless gateway wirelessly connected to at least one wireless process instrument using a wireless protocol, wherein the wireless gateway transmits instructions from the second controller to the at least one wireless process instrument and the second controller receives data from the wireless gateway that is received by the wireless gateway from the at least one wireless process instrument.

* * * * *